(12) United States Patent
Hart et al.

(10) Patent No.: US 8,688,500 B1
(45) Date of Patent: Apr. 1, 2014

(54) INFORMATION TECHNOLOGY RESILIENCY CLASSIFICATION FRAMEWORK

(75) Inventors: Christopher Thomas Hart, Charlotte, NC (US); Roger Michael Callahan, Charlotte, NC (US); Meera Sunderam Rao, Charlotte, NC (US); Susan McClung, Charlotte, NC (US); William Dean Peterson, St. Augustine, FL (US); Gerald Robert Silves, Jacksonville, FL (US)

(73) Assignee: Bank of America Corporation, Charlotte, NC (US)

( * ) Notice: Subject to any disclaimer, the term of this patent is extended or adjusted under 35 U.S.C. 154(b) by 1028 days.

(21) Appl. No.: 12/103,862

(22) Filed: Apr. 16, 2008

(51) Int. Cl.
  *G06Q 40/00* (2012.01)
  *G06Q 10/00* (2012.01)
  *G06F 11/00* (2006.01)
  *G06Q 10/06* (2012.01)

(52) U.S. Cl.
  CPC .................................. *G06Q 10/0635* (2013.01)
  USPC ........... 705/7.28; 714/E11.207; 714/E11.008; 714/1; 714/37; 714/39; 705/7.17; 705/7.31; 705/7.37; 705/7.42

(58) Field of Classification Search
  USPC ................................................. 705/7.11–7.42
  See application file for complete search history.

(56) References Cited

U.S. PATENT DOCUMENTS

| | | | | |
|---|---|---|---|---|
| 5,515,288 A * | 5/1996 | Aberson | ....................... | 700/173 |
| 6,557,120 B1 * | 4/2003 | Nicholson et al. | ......... | 714/38.13 |
| 7,023,825 B1 * | 4/2006 | Haumont et al. | ............. | 370/338 |
| 7,185,231 B2 * | 2/2007 | Mullally et al. | ........... | 714/38.14 |
| 7,349,340 B2 * | 3/2008 | Sahai et al. | .................... | 370/235 |
| 8,000,987 B2 * | 8/2011 | Hickey et al. | ..................... | 705/6 |
| 2002/0055999 A1 * | 5/2002 | Takeda | .......................... | 709/224 |
| 2002/0154646 A1 * | 10/2002 | Dubois et al. | ................ | 370/406 |
| 2002/0199182 A1 * | 12/2002 | Whitehead | ........................ | 725/1 |
| 2004/0059930 A1 * | 3/2004 | DiFalco et al. | ............... | 713/194 |
| 2004/0148209 A1 * | 7/2004 | Church et al. | ..................... | 705/7 |
| 2004/0153835 A1 * | 8/2004 | Song et al. | ...................... | 714/38 |
| 2004/0230953 A1 * | 11/2004 | Garzia et al. | .................. | 717/124 |
| 2004/0244004 A1 * | 12/2004 | Pardon et al. | ................. | 718/100 |
| 2005/0065841 A1 * | 3/2005 | Middleton | ...................... | 705/11 |
| 2005/0216320 A1 * | 9/2005 | Hattaway | .......................... | 705/7 |
| 2005/0240558 A1 * | 10/2005 | Gil et al. | ........................... | 707/1 |

(Continued)

OTHER PUBLICATIONS

Autenrieth, Achim, et al. Engineering End-to-End IP Resilience Using Resilience-Differentiated QoS. IEEE Communications Magazine. Jan. 2002.*

(Continued)

*Primary Examiner* — Leland Marcus
*Assistant Examiner* — Richard Scheunemann
(74) *Attorney, Agent, or Firm* — Banner & Witcoff, Ltd.; Michael A. Springs

(57) ABSTRACT

Techniques for assessing a resiliency level in an information technology system and architecting the information technology system in accordance with the resiliency level are disclosed. An estimated resiliency level may be estimated from different system characteristics to obtain an estimated resiliency level for the information technology system. The cost and the degree of effort to design for the information technology system may be estimated from the estimated resiliency level. The resiliency level may be further determined from different system factors. Consequently, a specification for a resiliency feature is obtained by accessing a set of resiliency guidelines based on the resiliency level and a technology theme. The resiliency feature may then be applied to the information technology system.

23 Claims, 29 Drawing Sheets

(56) References Cited

U.S. PATENT DOCUMENTS

| | | | |
|---|---|---|---|
| 2005/0256826 A1* | 11/2005 | Hambrick et al. | 707/1 |
| 2005/0278202 A1* | 12/2005 | Broomhall et al. | 705/7 |
| 2005/0288961 A1* | 12/2005 | Tabrizi | 705/1 |
| 2006/0004830 A1* | 1/2006 | Lora et al. | 707/102 |
| 2006/0112317 A1* | 5/2006 | Bartolini et al. | 714/47 |
| 2007/0027810 A1* | 2/2007 | Longnecker et al. | 705/51 |
| 2007/0050686 A1* | 3/2007 | Keeton et al. | 714/48 |
| 2007/0083504 A1* | 4/2007 | Britt et al. | 707/5 |
| 2007/0112715 A1* | 5/2007 | Chen et al. | 706/46 |
| 2007/0203974 A1* | 8/2007 | Baskey et al. | 709/203 |
| 2007/0243864 A1* | 10/2007 | Jaquet | 455/423 |
| 2007/0265899 A1* | 11/2007 | Angier et al. | 705/8 |
| 2008/0040364 A1* | 2/2008 | Li | 707/100 |
| 2009/0012800 A1* | 1/2009 | Devarakonda et al. | 705/1 |
| 2009/0119673 A1* | 5/2009 | Bubba | 718/104 |

OTHER PUBLICATIONS

Kang, Changhoon, et al. A Differentiated Service Mechanism Considering SLA for Heterogeneous Cluster Web Systems. IEEE Computer Society, 2006.*

Menth, Michael, et al. Robust IP Link Costs for Multilayer Resilience. IFIP International Federation for Information Processing, 2007.*

Aaron B. Brown and Peter Shum Measuring Resiliency of IT Systems IBM T.J. Watson Research Center (Hawthorne, NY),abbrown@us.ibm.com IBM Toronto Laboratory (Markham, ON, Canada) shum@ca.ibm.com. Nov. 8, 2005. p. 1-21.*

* cited by examiner

| Testing | Operational Considerations | Governors | Load Balancing & Degraded Mode | Component Interaction |
|---|---|---|---|---|
| | | Monitoring | Redundancy | |
| | | Data Management | | |
| | | Application Design Principles | | |
| Documentation | | | | |

FIG. 9

TECHNOLOGY THEME (G1): REDUNDANCY

High Resiliency

| Stack Layer | OS Cluster | Node Config | Load Bal Scope | HA (Auto Fail-Over) | Contingency Site | Grids |
|---|---|---|---|---|---|---|
| Network Connectivity | N/A | IPMP | Global | Global | N/A | N/A |
| TP Monitor | Preffered | N+M[2] | Site/Global[4] | Global | | N/A |
| Application Container | Preffered | N+M[2] | Site/Global[4] | Global | Optional[3] | Optional |
| Middleware Servers | Preffered | N+M[2] | Site/Global[4] | Global | | Optional |
| Service Providers | Preffered | N+M[2] | Global | Global | | Optional |
| DBMS | Required | N+M[2],A/A | N/A | Global | | N/A |
| Local Disk Storage (Non OS Data) | SAN | SAN | SAN | SAN | SAN | N/A |

Moderate Resiliency

| Stack Layer | OS Cluster | Node Config | Load Bal Scope | HA (Auto Fail-Over) | Contingency Site | Grids |
|---|---|---|---|---|---|---|
| Network Connectivity | N/A | IPMP | Global | Global | N/A | N/A |
| TP Monitor | Optional | N+1[1] | Site | Site | | N/A |
| Application Container | Optional | N+1[1] | Site | Site | Required | Optional |
| Middleware Servers | Optional | N+1[1] | Site | Site | | Optional |
| Service Providers | Optional | N+1[1] | Site | Site | | Optional |
| DBMS | Optional | N-to-1[1],A/P | N/A | N/A | | N/A |
| Local Disk Storage (Non OS Data) | SAN | SAN | SAN | SAN | Required | N/A |

Low Resiliency

| Stack Layer | OS Cluster | Node Config | Load Bal Scope | HA (Auto Fail-Over) | Contingency Site | Grids |
|---|---|---|---|---|---|---|
| Network Connectivity | N/A | IPMP Optional | Global | Global | N/A | N/A |
| TP Monitor | Not Required | N | Site | Manual Failover to Contingency Site | | N/A |
| Application Container | Not Required | N | Site | | Required | Optional |
| Middleware Servers | Not Required | N | Site | | | Optional |
| Service Providers | Not Required | N | Site | | | Optional |
| DBMS | Not Required | N-to-1[1],A/P | N/A | N/A | | N/A |
| Local Disk Storage (Non OS Data) | SAN | SAN | SAN | SAN | Required | N/A |

FIG. 10

TECHNOLOGY THEME (G2): MONITORING

| Requirements | Dev | Test.SIT.CIT | Prod | Disaster Recovery | Category | High | Moderate | Low |
|---|---|---|---|---|---|---|---|---|
| Monitoring capabilities should span end to end across multiple systems, business domains, shared systems. | No | Yes | Yes | Yes | End-to-End Monitoring. Heterogeneous systems | Required | Required | Optional |
| Monitoring capabilities should map, Monitor and trace transactions across heterogeneous applications, components, and infrastructure elements. | No | Yes | Yes | Yes | End-to-End Monitoring. Heterogeneous systems | Required | Required | Optional |
| Monitoring capabilities should provide real time view of transaction volumes by class of transaction, data and latencies. | No | Yes | Yes | Yes | Latency of Monitoring Information | Required | Required | Optional |
| Monitoring capabilities should be capable of providing real time visibility into quality of experience of real users at the transaction level. | No | Yes | Yes | Yes | Transaction Level Monitoring | Required | Required | Optional |
| Monitoring capabilities should support virtual user scripts run end to end to proactive and reactive diagnostics | No | Yes | Yes | Yes | Synthetic/Real Users | Required | Required | Optional |
| Monitoring capabilities should provide a single pane of glass view with event drills downs to code, data, messaging details for all monitoring capabilities | No | Yes | Yes | Yes | Management of Presentation of Monitoring | Required | Required | Optional |
| Monitoring capabilities should provide real time information available into integrated views available to QoE stakeholders: operations, LOB, BTG, support, application owners. | No | Yes | Yes | Yes | Latency of Monitoring Information | Required | Required | Optional |

FIG. 11A

| Requirements | Dev | Test,SIT,CIT | Prod | Disaster Recovery | Category | High | Moderate | Low |
|---|---|---|---|---|---|---|---|---|
| Monitoring capabilities should be homogeneous for lower environments, test, and production with the synergy to reuse scripts in all environments | No | Yes | Yes | Yes | Environments | Required | Required | Optional |
| Monitoring capabilities should provide a common view throughout dev., test and production environments | No | Yes | Yes | Yes | Environments | Required | Required | Optional |
| Monitoring capabilities should be complete application topology mapping. | No | Yes | Yes | Yes | Application Profiling | Required | Required | Optional |
| Monitoring capabilities should be heap/memory diagnostics real time at the transaction component level. | No | Yes | Yes | Yes | Depth of Monitoring | Required | Required | Optional |
| Monitoring capabilities should be topology and tracking of through out and destination for all outbound calls. | No | Yes | Yes | Yes | Depth of Monitoring | Required | Required | Optional |
| Monitoring capabilities should provide 24/7 alerting for thresholds that are exceeded | No | Yes | Yes | Yes | Alerting (Thresholds for SLA's, OLA's, LOB Rules) | Required | Required | Optional |
| Monitoring capabilities should provide application monitoring not the container (e.g. Websphere) | No | Yes | Yes | Yes | Application Profiling | Required | Required | Optional |
| Monitoring capabilities should provide warning before issues (events) affect users. | No | No | Yes | Yes | Alerting (Thresholds for SLA's, OLA's, LOB Rules) | Required | Required | Optional |

FIG. 11B

| Requirements | Dev | Test,SIT,CIT | Prod | Disaster Recovery | Category | High | Moderate | Low |
|---|---|---|---|---|---|---|---|---|
| Monitoring capabilities should provide assesment of business impact and prioritize resolution results based on rules. | No | No | Yes | Yes | Rules Management | Required | Required | Optional |
| Monitoring capabilities should provide active business process emulation consistent, repeatable transactions against apps. | No | Yes | Yes | Yes | Synthetic/Real Users | Required | Required | Optional |
| Monitoring capabilities should provide real user performance client side and server side. | No | Yes | Yes | Yes | Synthetic/Real Users | Required | Required | Optional |
| Monitoring capabilities should provide customizable, role based dashboards for multiple stake holders. | No | No | Yes | Yes | Monitoring Management | Required | Required | Optional |
| Monitoring capabilities should logging of all business events (process milestones) and messages. | No | Yes | Yes | Yes | Monitoring Management | Required | Required | Optional |
| Correlate end user experience and response time (front end) to the back end components | No | Yes | Yes | Yes | Synthetic/Real Users | Required | Required | Optional |
| Monitoring capabilities should isolate problems to specific infrastructure tiers and drill down into each tier. | No | Yes | Yes | Yes | Event Monitoring | Required | Required | Optional |
| Monitoring capabilities should integrate topology mapping with transaction flow. | No | Yes | Yes | Yes | Event Monitoring | Required | Required | Optional |

FIG. 11C

| Requirements | Dev | Test,SIT,CIT | Prod | Disaster Recovery | Category | High | Moderate | Low |
|---|---|---|---|---|---|---|---|---|
| Monitoring capabilities should automatically detect changes to applications and infrastructure. | No | Yes | Yes | Yes | System Management | Required | Required | Optional |
| Monitoring capabilities should maintain a threshold administrator feature to easily update dashboard thresholds as well as act dynamically during the course of an event. Automatic thresholds and actions need to be in Place. The solution must have the ability to auto recover. | No | Yes | Yes | Yes | Event Monitoring | Required | Required | Optional |
| Monitoring capabilities should provide a dashboard that can provide indications of population trends (distribution, average, standard deviation, confidence interval) and process control charts to help ensure single performance moments are not misinterpreted and potential correlations are spotted. | No | Yes | Yes | Yes | Event Monitoring | Required | Required | Optional |
| Monitoring capabilities should provide utilize existing bank standards (site minder) for authentication to provide a secure view to dashboards Views. This enables the requirement of the dashboard being available externally. | No | Yes | Yes | Yes | Security | Required | Required | Optional |

FIG. 11D

| Requirements | Dev | Test,SIT,CIT | Prod | Disaster Recovery | Category | High | Moderate | Low |
|---|---|---|---|---|---|---|---|---|
| Monitoring capabilities should significantly reduce the time and effort needed to drive corrective action and proactively identify problems before impacting users. | No | Yes | Yes | Yes | Event Monitoring | Required | Required | Optional |
| Monitoring capabilities should prevent and reduce FCI's and defects and enable development of SLA's and OLA's | No | Yes | Yes | Yes | Event Monitoring | Required | Required | Optional |
| QoCE metrics should be tied to business metrics. | No | Yes | Yes | Yes | Business Alignment | Required | Required | Optional |
| Monitoring capabilities should minimize any negative impact (performance and availability) to the systems they monitor | No | Yes | Yes | Yes | Predictive Monitoring | Required | Required | Optional |
| Monitoring capabilities should minimize the effort (human and system resources) required for their own configuration and operation. standard tools should be utilized in place of custom tools where possible. | Yes | Yes | Yes | Yes | Standardization | Required | Required | Optional |
| Monitoring capabilities should self-discover appropriate configurations and changes to greatest extent possible through iterations and is a requirement for final solution set. | Yes | Yes | Yes | Yes | Self Actuated Profiling | Required | Required | Optional |

FIG. 11E

| Requirements | Dev | Test,SIT,CIT | Prod | Disaster Recovery | Category | High | Moderate | Low |
|---|---|---|---|---|---|---|---|---|
| Monitoring views should provide filtering capability across the aggregated data | Yes | Yes | Yes | Yes | Monitoring Views of Data | Required | Required | Optional |
| Monitoring capabilities should be dynamically configurable and adjustable. | Yes | Yes | Yes | Yes | Dynamic Configuration/ Application profiling | Required | Required | Optional |
| Data point collection and retention (particularly for logging) should be tuned to an appropriate level to balance system resources and ability to provide the most useful context when problems occur. | Yes | Yes | Yes | Yes | Trending and Data Collection | Required | Required | Optional |
| Health status data points should be available real-time | No | Yes | Yes | Yes | Real Time Health Status | Required | Required | Optional |
| Alerts should provide the necessary context for corrective action to be identified and taken. | Yes | Yes | Yes | Yes | Alerts | Required | Required | Optional |
| The correlation layer should increase the efficiency in identifying a problem's root cause by minimizing "noise" generated by multiple data points related to a problem and by minimizing false positives. | No | Yes | Yes | Yes | Integration of Monitoring View | Required | Required | Optional |
| Diagnostic Tools should interoperate with the monitoring views to increase the efficiency of the end user. | No | Yes | Yes | Yes | Integration of Monitoring View | Required | Required | Optional |

FIG. 11F

| Requirements | Dev | Test,SIT,CIT | Prod | Disaster Recovery | Category | High | Moderate | Low |
|---|---|---|---|---|---|---|---|---|
| Monitoring and Monitoring Mangement solution should have the ability to comply with all corporate information production security, technology security, and risk guidelines. | Yes | Yes | Yes | Yes | Security | Required | Required | Optional |
| Stopped processing of messages. Monitoring thresholds must be set to warn of impending failure before an outage occurs. | No | Yes | Yes | Yes | System Management | Required | Required | Optional |
| Condition. Monitoring thresholds must be set to warn of impending failure before an outage occurs. | No | Yes | Yes | Yes | System Management | Required | Required | Optional |
| Critical application resources (resource pools, socket connections, IMS resources, database connections, etc.) must be instrumented for monitoring. | No | Yes | Yes | Yes | System Management | Required | Required | Optional |
| Monitoring thresholds should be set to warn of HTTP(S) transport must be instrumented and monitored to detect queing of connections (indicating slow responses) and timeouts. Monitoring thresholds must be set to warn of impending failure before an outage occurs. | No | Yes | Yes | Yes | System Management | Required | Required | Optional |

FIG. 11G

TECHNOLOGY THEME (G3): GOVERNORS

Resiliency Classification

| | High | Moderate | Low |
|---|---|---|---|
| | Required where applicable | Recommended | Optional |

Consider using a governor when:

- The system cannot control the number of requests that it receives from upstream components/clients and receiving too many request will cause the system to be unstable, fail, or not perform within its SLA
- The system is dependent on downstream components When considering using a governor, always assume that downstream components *will* fail or perform more slowly than designed.

FIG. 12

TECHNOLOGY THEME (G4): MONITORING

| | | | Resiliency Classification | | |
|---|---|---|---|---|---|
| DMAIC Phase | Guideline Shortname | Guideline | Rationale | High | Moderate | Low |
| Define | Document Resiliency Class for Charter Estimates | Document the resiliency class of the initiative based on the scope and functionality known at Define phase when the charter is being constructed. Utilize the Resiliency Class Charter Estimation Tool to identify the Resiliency design classs. | Identifying the resiliency class of the system at the early phase of definition allows for improved budget estimation of the project and improved financial benefits analysis. In the future, the resiliency class and the solution pattern can be the basis for standardized cost models. | Required | Recommended | Recommended |
| | Document Resiliency Design Class | Document the resiliency class of the initiative based on the scope and functionality documented in the BRD. Utilize the Resiliency Design Class Tool to identify the Resiliency design class. | Identifying the resiliency class of the system helps reference the applicable resiliency Guidelines. | Required | Recommended | Recommended |
| | Document Rationale for design class and criteria for change | Document justifications for the choice of resiliency design class. Document the criteria and thresholds for recommended change in design class(higher or lower) if known. | Helps the system owner's identify the impact of change and design the appropriate resiliency into the system when the thresholds are reached | Required | | |

FIG. 13A

| DMAIC Phase | Guideline Shortname | Guideline | Rationale | Resiliency Classification | | |
|---|---|---|---|---|---|---|
| | | | | High | Moderate | Low |
| Measure | Document Resiliency ASRs in terms of solution context covering all the appropriate resiliency framework elements | Reference the resiliency guidelines to identify the appropriate Architecture Significant Requirements related to system resiliency. Specify the ASRs in terms of the solution context and known system components. Document the ASRs in the BRD to ensure their traceability to the architecture, design and implementation | Identifying resiliency ASRs will ensure that systems are designed with resiliency in mind. | Required | Required | Required |
| | Document Resiliency concepts | Incorporate resiliency solutions into the conceptual architecture (structural and behavioral views) using the appropriate level of abstraction (conceptual). Defer the documentation of the logical and physical resiliency solution to the appropriate phase (Analyze) | Refraining from elaborating solutions too early in the process results in cost effective and well thought out designs | Required | Required | Recommended |
| | Document Resiliency solutions and rationale | Incorporate resiliency solutions into the logical and physical architecture (structural and behavioral views). This is where most of the resiliency solutions are incorporated into the system architecture. Document details and rationale for architectural choices for resiliency for the benefit of the designers. | Documenting solutions and rationale results in effective translation of architecture into design elements. | Required | Required | Desirable |

FIG. 13B

| | | | Resiliency Classification | | |
|---|---|---|---|---|---|
| DMAIC Phase | Guideline Shortname | Guideline | Rationale | High | Moderate | Low |
| Analyze | Document Component FMEAs | For each system component identified in the Solutions architecture, document an FMEA. Identify all the failure modes of each component, the severity of the effects as well as how the system design mitigates the risk of failure modes. When there are gaps that may cause potential failures, design solutions for the gaps and update the solution architecture and design | Component FMEAs result in identifying failure modes and improves the resiliency characteristics of the solution | Required | Recommended | Optional |
| | Document "User Experience" FMEAs | For each critical transaction, perform a "User Experience FMEA". This FMEA is performed from the perspective of a user and considers the failure modes of all the components of the system that are involved in the transaction | User Experience FMEAs result in identifying failure modes of the end to end user transactions and the resulting end user experience. This provides the opportunity to further improve the resiliency characteristics for the system and results in improved user experience | Required | Recommended | Optional |
| | Document the traceability of resiliency ASRs to Solution architecture and design | Perform traceability of resiliency ASRs to solution architectures and Design | Requirements traceability is essential to successful initiatives and stakeholder satisfaction | Required | Required | Required |

FIG. 13C

| DMAIC Phase | Guideline Shortname | Guideline | Rationale | Resiliency Classification | | |
|---|---|---|---|---|---|---|
| | | | | High | Moderate | Low |
| Improve | Document the traceability of resiliency testing and monitoring ASRs to Solution architecture and design | Perform traceability of resiliency ASRs to test plans and monitoring solutions. | Requirements traceability is essential to successful initiatives and stakeholder satisfaction | Required | Required | Required |
| Control | Update System level documentation | Update the system level documentation (distinct from initiative level documents) to reflect the architecture, design and resiliency characteristics | Updated System documentation is key to operational stability | Required | Required | Required |

FIG. 13D

TECHNOLOGY THEME (G5): LOAD BALANCING

| Application Classification | General Redundancy guideline by application Classification | | | | Comment |
|---|---|---|---|---|---|
| | Hot/HOT | Hot/Warm | Hot/Cold | Single Site | |
| High | P | V | | | |
| Moderate | | P | V | | |
| Low | | | P | V | |

| Stack Layer | Preferred/Valid options by layer | | | | Comment |
|---|---|---|---|---|---|
| | Hot/Hot | Hot/Warm | Hot/Cold | One-site Multi JVM/Websrvr | |
| Legend:P=Prefferred, V=Valid, Nr=Not required | | | | | |
| 3DNS | | | | | Part of network layer |
| Round Robin Local only | | | P | N/A | No Geographical |
| Round Robin Global | P | | | N/A | Geographical without affinity |
| Topolgy | V | | | N/A | Round Robin & Geographical load balancing |
| Round Robin with Failover | | P | | N/A | No Geographical |
| Bigip | | | | | Applicable to Web/App/Service Layer |
| Round Robin | V | V | V | V,Nr | |
| Least Connections | V | V | V | V,Nr | |
| Cookie Affinity | P | P | P | P,Nr | R.Robin 1st request follow cookie until session end |
| Ratio | V | V | V | V,Nr | Use only with Mismatched Target servers |
| Webserver | | | | | Complications when used with SSO & Sitekey |
| Clustered Stateful | All Options are valid for all configs, since webserver only deals at local level only. The preferred mechanism is dependent on the application need for handling State | | | | |
| Round Robin/Sticky | | | | | |
| Round Robin | | | | | |
| XML messaging | | | | | |
| Information Affinifty | V | V | V | V | Devices balance at request request leve not Connecition Level and sits behind it's own BIGIP device |
| Information Round Robin | V | V | V | V | |
| Information Round Robin Perf Aware | P | P | P | P | |

FIG. 14A

| | | | | | |
|---|---|---|---|---|---|
| Oracle | | | | | |
| Oracle Standalone | P | | | | |
| Oracle Rac | | P | | +V+ | |
| Oracle Rac with replication | | | P | P | |
| Oracle replication | +V+ | +V+ | | | |
| MqSeries Mainframe | | | | | |
| Clustered Queues | +V+ | +V+ | +V+ | N/A | |
| Shared Queues | P | +V+ | +V+ | N/A | |
| Shared Channels | | +V+ | +V+ | N/A | |
| MqSeries Distributed | | | | | |
| Clustered Queues | P | P | P | N/A | |

FIG. 14B

TECHNOLOGY THEME (G6): DEGRADED MODE

| Action | Appropriate Usage | Resiliency Class | | | Comment |
|---|---|---|---|---|---|
| | | High | Moderate | Low | |
| CRUD (Create, Read, Update, Delete) | CRUD (Create, Read, Update, Delete) | | | | |
| Store and Forward | Create, Update, Delete | Optional | Optional | Optional | Appropriate if customer doesn't require immediate confirmation of availability of service or expectation of fulfillment of request (Eg: Money available for immediate use in Checking account). Customer could be told that their request will be fulfilled at a later time and that a status or confirmation will be available with mode of delivery of status/confirmation channel (Check on OLB or e-mail will be sent etc.). Meanwhile, from an architectural perspective, downstream effects of a failed real-time update should be considered to ensure that the store and forward to SOR is timed to ensure that the SOR can complete its downstream data flows (Eg: nightly batch). If Store and Forward is a solution, a pacing algorithm must be considered to ensure that the SOR is not flooded with updates. |
| Alternate Path Data Source | Read | Required Where Applicable | Optional | Optional | This solution is warranted if the primary data source is unavailable and an alternate source has the information being accessed. Quality of alternate data should be evaluated before this solution is employed. Need good example here.... |
| Alternate Delivery Channel | Read | Required | Recommended | Optional | Elicit business requirements for when the current channel of service is unable to satisfy the customer, that the customer is redirected as automatically as possible to a channel that can provide the service. Eg: Call center applications (VGS) would switch to an agent, Branch representative may get redirected to a green screen to get data. |

FIG. 15A

| | | | | |
|---|---|---|---|---|
| Default Action Pattern | All | Required | Recommended | Optional | This pattern is warranted when the customer's expectation is immediate service fulfillment and the business risk of minimally fulfilling the service without significant losses is acceptable. It is used to provide minimum service to customer (Ex: Atm is not online allow up to $nnn withdrawal), authorization request default action could be ok up to a limit. |
| Answer not Available | All | Required | Recommended | Optional | A service that does not interface directly with a customer, should recognize its customer facing client and respond immediately with an indicator that the client cannot be serviced rather than allow the client to block until it times out. |
| Inquiry Only Mode | Create, Update, Delete | Required | Recommended | Optional | A service that provides CRUD operations should be designed to minimally provide its read operations when in a degraded mode. |
| Proactive Notification | All | Required | Recommended | Optional | Proactively tell client system is having difficulties please switch to degraded mode. |
| Partial Fulfillment Model | All | Required1 | Required | Optional | Customer Facing apps presenting an aggregation of Data from multiple sources should present what data it can with notes the others could not be presented at this time |

FIG. 15B

TECHNOLOGY THEME (G7): COMPONENT INTERACTION

| Guideline | Resiliency Classification | | | Example |
|---|---|---|---|---|
| | High | Moderate | Low | |
| Prefer local calls between components but provide a switch to enable remote calls between components if decoupling is required for failover. | Required | Required | Required | For BOSS to WCC today that is a local call for performance reasons. But do to a local call nature that ties BOSS to the region its in. As part of WCC we are enabling BOSS in a failover/rolling change mode (manual procedure) to make a remote MQ call to alt site instead of local call. |
| Design services to provide dynamic behavior dependent on the needs of the consumer. (Example: variable timeout levels, variable error levels) | Recommended | Recommended | Optional | Optional |
| When data replication is needed between multiple sites, process transactions on one copy and utilize qrep for replication to the other site when asynchronous updates are acceptable. (Avoid data replication methods which involve sending transactions to multiple sites to update datastores. This causes synchronization issues in the case where one site fails to update.) | Optional | Optional | Optional | WCC Transactions are processed on one copy and qrep is used for replication. |

FIG. 16

TECHNOLOGY THEME (G8): OPERATIONAL CONSIDERATIONS

| Guideline | Resiliency Classification | | | Example |
|---|---|---|---|---|
| | High | Moderate | Low | |
| Project team must create Operational Procedures to support internal failover, between site failover, and rolling change. (This is a shared responsibility with operations and architecture.) | Required | Required | Optional | 1) Design detailed "Task List" that detail step-by-step operational procedures, reponsible group/person, task dependencies and pertinent comments for the specific tasks. The high-level categories within the Task List include activities associated with pre-failover, distributed servers, mainframe platform, technical certification, and functional certification for failover and fallback. Main categories include: Pre-failover (fallback) Activities- paging the tech-nical resources, business partners, other terms impacted by the failover, assembling the appropriate teams to perform the failover. Capacity on Demand activities if needed Distributed Server activities - enable/ disable MQ queues. Mainframe activities Technical Certification activities - monitor key system components performance & capacity to ensure system is working properly. Functional Certification activities - business partner representatives perform end to end transactions to validate the "system" is working properly. 2) Creating Failover Decision Trees that will be a flowchart created to assist systems management in determining if the environment should failover. The Failover Decision T |
| Design Rolling change capabilities to enable code migrations with no system outage | Recommended | Recommended | Optional | |

FIG. 17

TECHNOLOGY THEME (G9): APPLICATIONS DESIGN

| Guideline | Resiliency Classification | | |
|---|---|---|---|
| | High | Moderate | Low |
| Asynchronous event driven pattern for updates - especially monetary transactions | Recommended | Recommended | Recommended |
| Prefer asynchronous communications when possible. Use synchronous communications only when process dependencies require it. | Recommended | Recommended | Recommended |
| Use descriptive error messages and unique error numbering when returning errors to calling systems. | Recommended | Recommended | Desirable |
| Architects should promote the use of consistent errors types and severity levels and have errors specifically when they cause the loss of resiliency. | Recommended | Recommended | Optional |
| Consider changing updates from database level to transaction level. | Recommended | Recommended | Optional |
| Improve problem determination through improved event timestamp system for interconnected system | Recommended | Recommended | Optional |
| Application log files can be local - no point sharing / copying between sites. | Recommended | Recommended | Optional |

FIG. 18 ized by way of example and
INFORMATION TECHNOLOGY RESILIENCY CLASSIFICATION FRAMEWORK

FIELD OF THE INVENTION

The disclosure generally relates to determining a resiliency level in an information technology system and to architecting the information technology system in accordance with the resiliency level.

BACKGROUND

Information technology systems often play an important role in the success of a business. A company typically operates in a highly competitive environment, in which the operation of the company's information technology systems can differentiate the company from its competitors. Consequently, resiliency for technology solutions is often closely related to competitive advantage. For example, the technology that supports banking centers, ATMs, telephone banking, and online banking channels must be reliable and highly available in order for a bank to maintain and grow market share. If the bank is unable to satisfy a customer's request through one of these channels, the bank runs the risk of losing a customer. Certain types of failures may also present direct financial, reputation, legal, or compliance risk.

At the same time, building resilient solutions can be expensive. It is not cost-effective to build every solution to be highly resilient. Different systems require different levels of resiliency in order to be cost-competitive. Accurately assessing those needs and implementing adequate resiliency features are important. As a result, the resiliency needs of a solution are rarely explicitly identified. When this was done, the resiliency needs are often poorly defined with inconsistent criteria. Lacking a consistent assessment framework can make it difficult to consistently apply resiliency features based on a solution's need. As a result, inconsistencies for incorporating resiliency in an information technology system may occur. These inconsistencies may degrade system efficiency, both in terms of the efficiency of solutions as well as design effort.

BRIEF SUMMARY

The present disclosure addresses one or more of the issues mentioned above by disclosing methods and computer readable media for determining a resiliency level in an information technology system and for architecting the information technology system in accordance with the resiliency level. The determined resiliency level is selected from a plurality of resiliency classifications, e.g., high, moderate, and low.

According to an aspect of the disclosure, an estimated resiliency level of a technology system may be estimated from different system characteristics to obtain an estimated resiliency level for the information technology system. The cost and the degree of effort to design for the information technology system may be estimated from the estimated resiliency level. Business requirements may be generated from the estimated resiliency level.

According to an aspect of the disclosure, a resiliency level of a technology system is determined from different system factors. Consequently, a specification for a resiliency feature is obtained by accessing a set of resiliency guidelines based on the resiliency level and a technology theme. The resiliency feature may then be applied to the information technology system.

When determining the resiliency level, a factor value may be assigned to each combination of system factor and resiliency classification. The factor values are summed over each of the plurality of resiliency classifications to obtain a total value corresponding to each of the plurality of resiliency classifications. The resiliency level is selected based on the total values corresponding to each resiliency classification. System factors may be further weighed so that each system factor is adjusted based on the corresponding weight.

Aspects of the disclosure may be provided in a computer-readable medium having computer-executable instructions to perform one or more of the process steps described herein.

These and other aspects of the disclosure are discussed in greater detail throughout this disclosure, including the accompanying drawings.

BRIEF DESCRIPTION OF THE DRAWINGS

The present disclosure is illustrated by way of example and not limited in the accompanying figures in which like reference numerals indicate similar elements and in which:

FIG. 9 shows the structure of a handbook for resiliency guidelines in accordance with an embodiment.

FIGS. 10-18 show exemplary resiliency guidelines having worksheets corresponding to technology themes in accordance with an embodiment.

DETAILED DESCRIPTION

In the following discussion, information technology resiliency refers to the ability of an information technology system (a collection of technology components, including hardware and software) to provide and maintain an acceptable level of service in the face of various faults and challenges to normal operation. The degree to which a system is resilient (i.e., able to continue to function despite failures of components) is dependent on the selection of appropriate components (hardware or software) in that system and how those components are built and arranged.

An information technology system may support different types of services, including finance (e.g., banking), science and engineering, government, and telecommunications.

In accordance with various aspects of the disclosure, methods and systems are disclosed for determining the resiliency features into a technology information system based on a determined resiliency level. Resiliency for technology solutions is often closely related to competitive advantage. For example, the technology that supports banking centers, ATMs, telephone banking, and online banking channels must be reliable in order for a bank to maintain and grow market share. If the bank is unable to satisfy a customer's request through one of these channels, the bank runs the risk of losing a customer. Certain types of failures may also present direct financial, reputation, legal or compliance risk.

At the same time, building resilient solutions may be expensive. It is not cost-effective to build every solution to be highly resilient. Different systems require different levels of resiliency in order to be cost-competitive. Accurately assessing those needs and implementing adequate resiliency features may be important.

Figure 1:
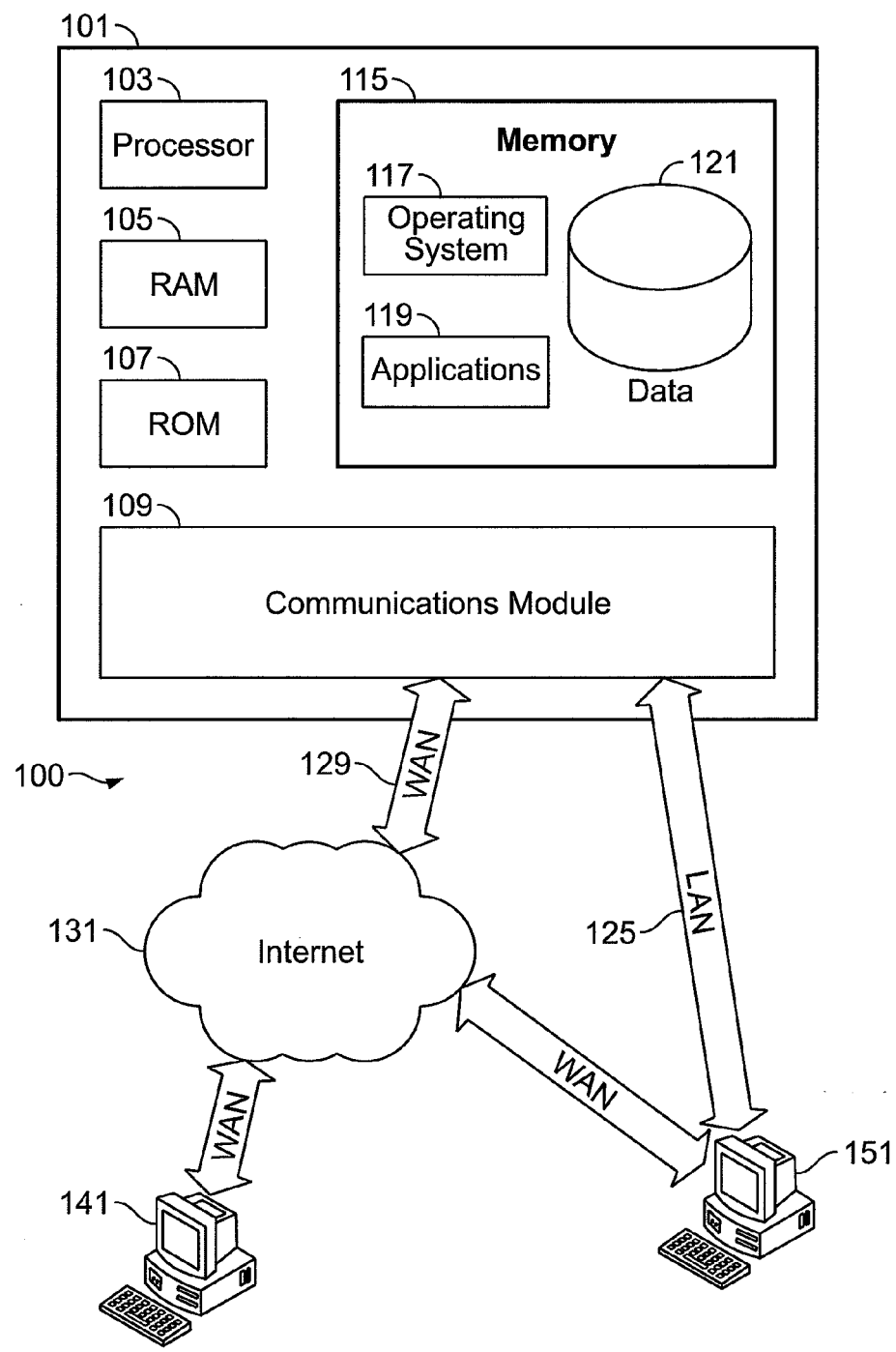
FIG. 1 shows an illustrative operating environment in which various aspects of the disclosure may be implemented.
Figure 7:
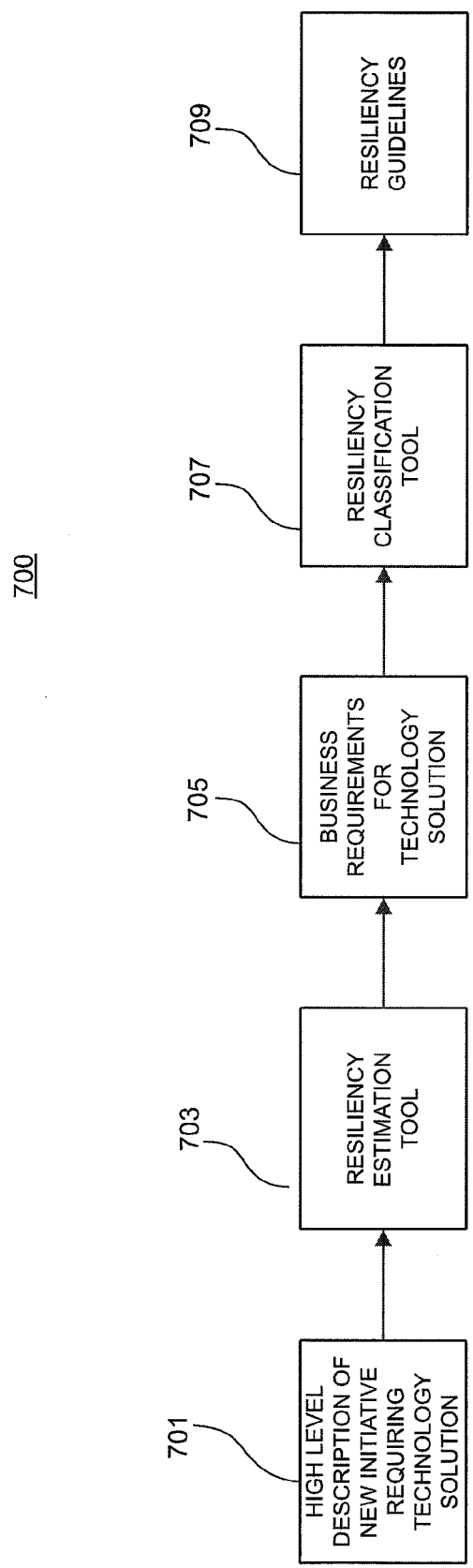
FIG. 7 shows a resiliency framework system in accordance with an embodiment.

FIG. 1 illustrates an example of a suitable computing system environment 100 (e.g., resiliency framework system 700 as shown in FIG. 7) that may be used according to one or more illustrative embodiments. The computing system environment 100 is only one example of a suitable computing environment and is not intended to suggest any limitation as to the scope of use or functionality of the invention. The computing system environment 100 should not be interpreted as having any dependency or requirement relating to any one or combination of components illustrated in the illustrative computing system environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

With reference to FIG. 1, the computing system environment 100 may include a computing device 101 wherein the processes discussed herein may be implemented. The computing device 101 may have a processor 103 for controlling overall operation of the computing device 101 and its associated components, including RAM 105, ROM 107, communications module 109, and memory 115. Computing device 101 typically includes a variety of computer readable media. Computer readable media may be any available media that may be accessed by computing device 101 and include both volatile and nonvolatile media, removable and non-removable media. By way of example, and not limitation, computer readable media may comprise and combination of computer storage media and communication media.

Computer storage media include volatile and nonvolatile, removable and non-removable media implemented in any method or technology for storage of information such as computer readable instructions, data structures, program modules or other data. Computer storage media include, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computing device 101.

Communication media typically embodies computer readable instructions, data structures, program modules or other data in a modulated data signal such as a carrier wave or other transport mechanism and includes any information delivery media. Modulated data signal is a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Although not shown, RAM 105 may include one or more are applications representing the application data stored in RAM memory 105 while the computing device is on and corresponding software applications (e.g., software tasks), are running on the computing device 101.

Communications module 109 may include a microphone, keypad, touch screen, and/or stylus through which a user of computing device 101 may provide input, and may also include one or more of a speaker for providing audio output and a video display device for providing textual, audiovisual and/or graphical output.

Software may be stored within memory 115 and/or storage to provide instructions to processor 103 for enabling computing device 101 to perform various functions. For example, memory 115 may store software used by the computing device 101, such as an operating system 117, application programs 119, and an associated database 121. Alternatively, some or all of the computer executable instructions for computing device 101 may be embodied in hardware or firmware (not shown). Database 121 may provide centralized storage of customer, account, or other information that is critical to the successful operation of the software and system.

Computing device 101 may operate in a networked environment supporting connections to one or more remote computing devices, such as branch terminals 141 and 151. The branch computing devices 141 and 151 may be personal computing devices or servers that include many or all of the elements described above relative to the computing device 101.

The network connections depicted in FIG. 1 include a local area network (LAN) 125 and a wide area network (WAN) 129, but may also include other networks. When used in a LAN networking environment, computing device 101 is connected to the LAN 825 through a network interface or adapter in the communications module 109. When used in a WAN networking environment, the server 101 may include a modem in the communications module 109 or other means for establishing communications over the WAN 129, such as the Internet 131. It will be appreciated that the network connections shown are illustrative and other means of establishing a communications link between the computing devices may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, one or more application programs 119 used by the computing device 101, according to an illustrative embodiment, may include computer executable instructions for invoking user functionality related to communication including, for example, email, short message service (SMS), and voice input and speech recognition applications.

Embodiments of the disclosure may include forms of computer-readable media. Computer-readable media include any available media that can be accessed by a computing device 101. Computer-readable media may comprise storage media and communication media. Storage media include volatile and nonvolatile, removable and non-removable media implemented in any method or technology for storage of information such as computer-readable instructions, object code, data structures, program modules, or other data. Communication media include any information delivery media and typically embody data in a modulated data signal such as a carrier wave or other transport mechanism.

Although not required, one of ordinary skill in the art will appreciate that various aspects described herein may be embodied as a method, a data processing system, or as a computer-readable medium storing computer-executable instructions. For example, a computer-readable medium storing instructions to cause a processor to perform steps of a method in accordance with aspects of the disclosure is contemplated. For example, aspects of the method steps disclosed herein may be executed on a processor on a computing device 101. Such a processor may execute computer-executable instructions stored on a computer-readable medium.

Figure 2:
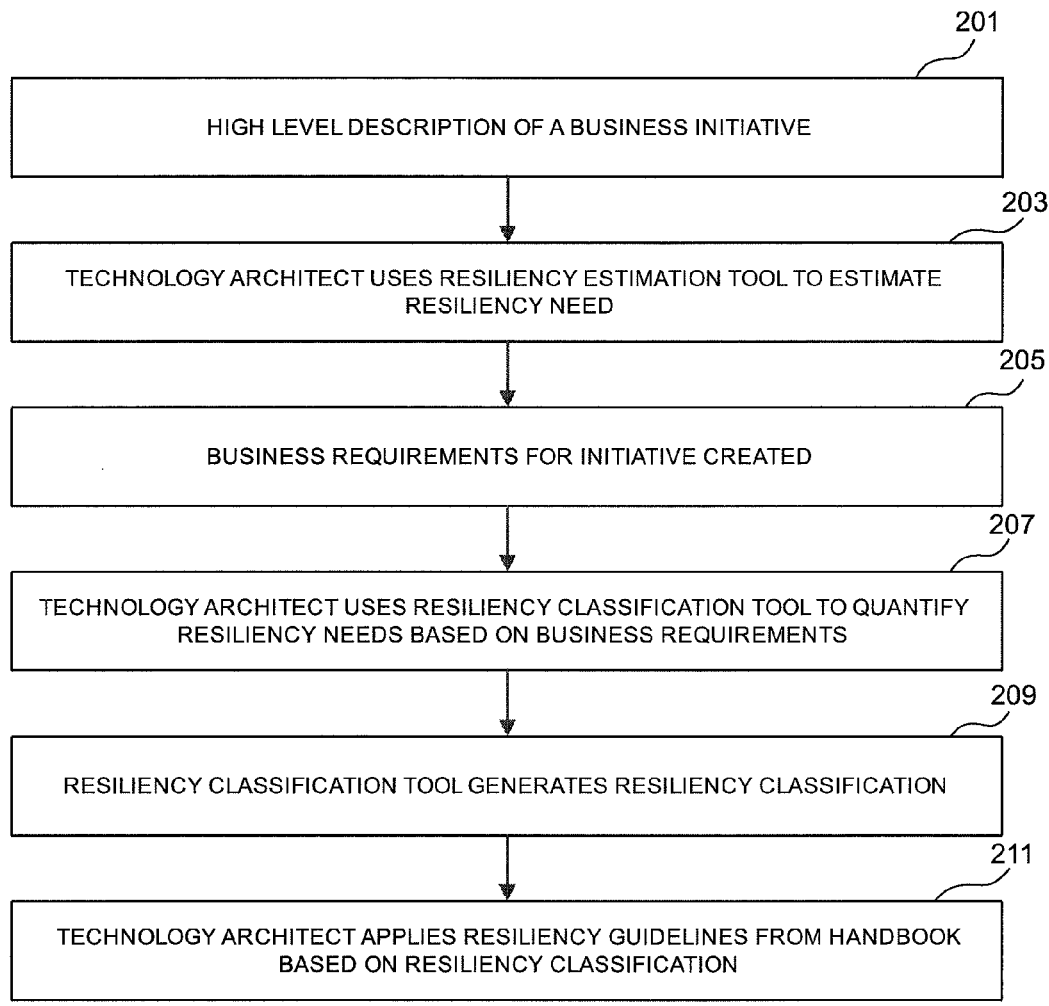
FIG. 2 shows a high level process flow in accordance with an embodiment.

FIG. 2 shows high level process 200 in accordance with an embodiment. A resiliency classification framework may be used at the bank within the context of new business initiatives (corresponding to step 201) as well as in an ad-hoc nature for existing solutions when evaluating whether their design meets their resiliency need. While the framework is used in a particular context at the bank, it may be leveraged in a variety of ways both at the bank and by others in the industry.

In the following discussion, a tool includes a software tool. A software tool is a program that aids in the development of other programs. It may assist the programmer in the design, code, compile, link, edit, or debug phases of a system.

Within the context shown in FIG. 2, the estimation tool (corresponding to resiliency estimation tool 703 as shown in FIG. 7 and as will be further discussed with FIG. 3) is used in the early stages of evaluating a proposed business initiative (often before it has been funded). This approach generally occurs in the idea generation or define phase of a project where the project charter has been created but no business requirements are available. The early application of the resiliency framework through the estimation tool gives the technology architect an idea of how resilient the solution will need to be as shown in step 203. This helps drive estimates related to the cost of the solution itself (the information technology (IT) components including hardware and software) as well as the effort related to creating the design (which contributes to the initiative cost). The application of the resiliency classification framework as well as its application at an early stage of design is unique with respect to the prior art. If the initiative continues beyond this stage, business requirements are drafted and turned over to the technology partners (including technology architecture) responsible for delivery the IT solution for the initiative in step 205. At this point, the initiative has more detail about its needs, allowing for a more detailed assessment of the resiliency needs. The framework classification tool (corresponding to 707 as shown in FIG. 7 and as will be further discussed with FIG. 4) is used to make the assessment of the resiliency needed by the final solution as shown in step 207.

Once the resiliency classification (e.g., high, moderate or low) has been determined as shown in step 209, the technology architect uses the resiliency handbook to determine which resiliency features need to be applied as shown in step 211. The resiliency handbook organizes numerous "resiliency guidelines" into technology themes and asserts their importance to the resiliency of a solution (e.g., required, recommended or optional) based on the resiliency classification. This organization and classification of resiliency guidelines using the framework are also unique with respect to the prior art.

Figure 3:
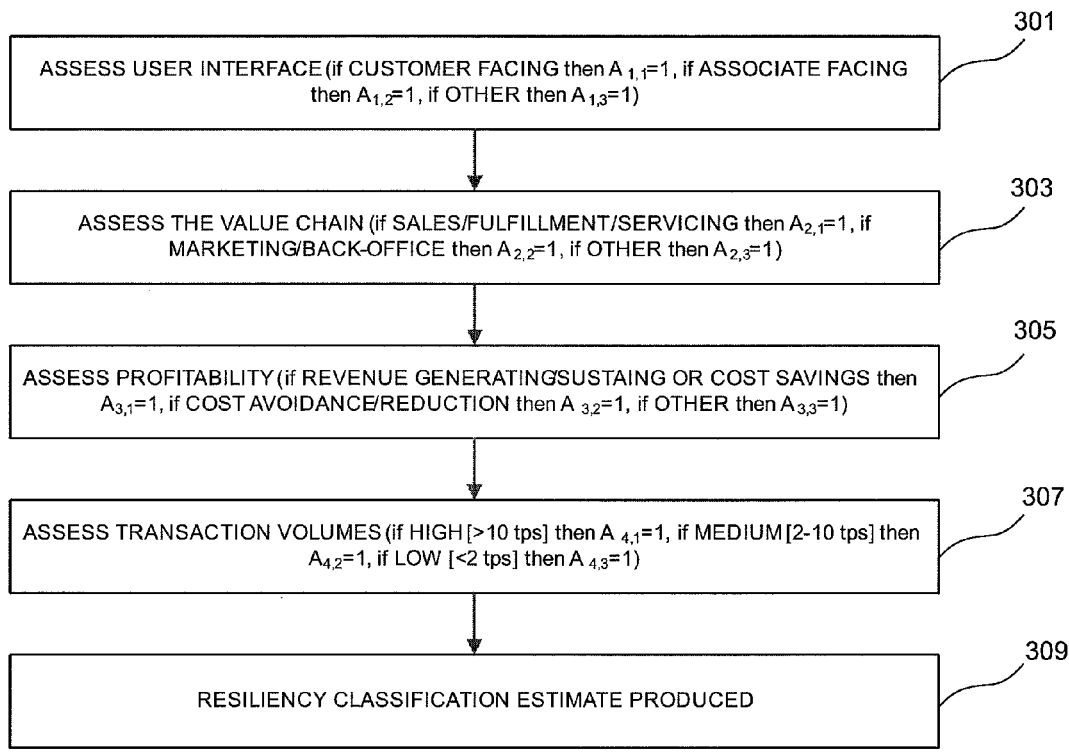
FIG. 3 shows a resiliency framework estimation process flow in accordance with an embodiment.

FIG. 3 shows resiliency framework estimation process 300 in accordance with an embodiment. The corresponding estimation tool (corresponding to resiliency estimation tool 703 as shown in FIG. 7) is used in the early stages of evaluating a proposed business initiative. The resiliency features of an application are related to the cost of the solution. Building highly resiliency solutions may add significant cost to an initiative. By providing estimation early, framework estimation process 300 enables a business to determine the value of continuing to move forward based on the costs.

Different system characteristics (e.g., the user interface, value chain, profitability, transaction volumes) are assessed in steps 301-307 to estimate the resiliency level of the information technology system from a plurality resiliency classifications (e.g., high, moderate, and low).

Process 300 can be implemented with a number of different approaches. For example, in steps 301-307, two matrices (A and B) of size 4×3 are used to calculate the resiliency level. Matrix A is initialized to all 0's and stores the results of four assessment criteria corresponding to steps 301-307. Matrix B records the weight of the system characteristics on the resiliency level. Matrix B is initialized to all 1's as the default. However, the weighing factors may be customized for specific environmental and business concerns.

With an embodiment, customer facing denotes that the customer is directly interacting with the system or component in question, for example, and online banking application on the internet providing customer self-service.

With an embodiment, associate facing denotes that the system or component is used by a bank employee ("associate"). There are two variations on associate facing applications that may be important to distinguish:
- Associate-facing applications for providing customer service. In this scenario, a failure of the system will still impact a customer. (For example, if a bank teller is using an application and a component in that application fails, a customer is still affected.)
- Associate-facing applications for associate service. In this case, the failure is not directly visible to external customers.

With an embodiment, value-chain is a way of assessing the importance of the application. Value-chain may be divided into three categories:
- Sales, Fulfillment or Servicing: These applications are involved with selling products to customers (for example, an application used in a banking center to setup new customer accounts), fulfillment of a product (for example, mortgage fulfillment to process and provide a mortgage to a customer, or production of credit card collateral to a new customer), and servicing (enabling the bank to take action on a customer's product—for example, changing a customer address).
- Marketing or Back-office: These are deemed as less critical because they don't directly impact our ability to service a customer but are still important to the company's business execution
- Other, to capture ancillary functions that do not fall into the first two categories.

In step 309, the resiliency level is estimated by calculating the Hadamard product (entrywise product) of matrices A and B in matrix C. Subsequently in step 309, resiliency estimation tool 703 determines:

$$x = \sum_{j=1}^{4} C_{j,1}$$

EQ. 1A $$y = \sum_{j=1}^{4} C_{j,2} \qquad \text{EQ. 1B}$$

$$z = \sum_{j=1}^{4} C_{j,1} \qquad \text{EQ. 1C}$$

If x>y≥z, then the resiliency level is estimated to be high. If y>x≥z, then the resiliency level is estimated to be moderate (medium). If z>x≥y, then the resiliency level is estimated to be low. Otherwise, the resiliency level is estimated to be medium.

Figure 4:
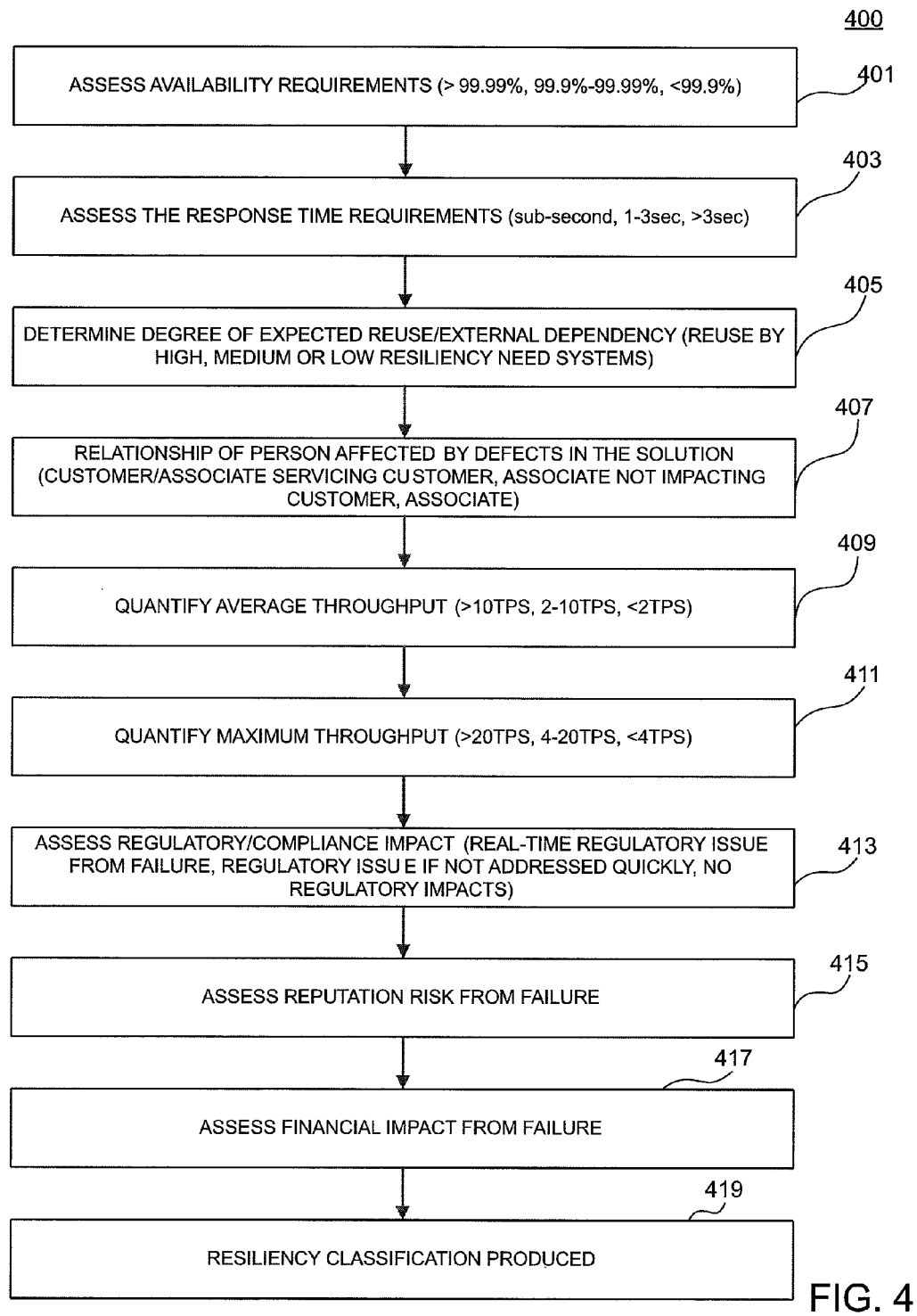
FIG. 4 shows a framework classification process flow in accordance with an embodiment.

FIG. 4 shows framework classification process 400 (as performed by resiliency classification tool 707 as shown in FIG. 7) in accordance with an embodiment. The use of classification framework process 400 allows architects to determine the resiliency needs of a solution.

Resiliency classification framework tool 707 is a tool that assesses how resilient a system needs to be based on a number of factors (such as who uses the system, the legal, compliance and regulatory risk posed by failure, and who is affected by a failure). Corresponding to step 419 in FIG. 4, a resiliency level is determined from different system factors corresponding to steps 401-417.

In the embodiment shown in FIG. 4, system factors include availability requirements (step 401), response time requirements (step 403), degree of expected reuse (step 405), relationship of person affected by defects (step 407), average throughput (step 409), maximum throughput (step 411), regulatory/compliance impact (step 413), reputation risk from failure (step 415), and financial impact from failure (step 417).

The degree of reuse relates to how the component or solution could be (or become) shared from the component's/solution's point-of-view for which you are classifying the resiliency need. As such, the "can be reused" is meant to ask how that particular solution is intended (or should be possible) to be reused by other systems. (The solution under consideration is the provider, in this sense.)

This is pertinent to the assessment because it is possible to insert components into a system (through reuse or "sharing") that are not of the same resiliency. If a low resiliency component were reused by a high resiliency component, it would degrade the overall resiliency of the system. This question is intended to ensure that resiliency capabilities are synchronized throughout a system to prevent inadvertent degradation of resiliency.

Process 400 assesses system requirements in order to determine a resiliency level for the information technology system from a plurality of resiliency classifications. The resiliency level is used to determine which design guidelines to apply that enable the resulting system to provide the needed level of resiliency. Resiliency needs, for example, can be classified as high, moderate, or low. Systems classified in this manner have different needs in terms of system resources and designs.

Similar with process 300, a matrix approach may be used to determine the resiliency level from the system factors with process 400. For example, in steps 401-417, two matrices (A and B) of size 9×3 are used to calculate the resiliency level. Matrix A is initialized to all 0's and stores the results of four assessment criteria corresponding to steps 401-417. Matrix B records the weight of the system factors on the resiliency level. Matrix B is initialized to all 1's as the default. However, the weighing factors may be customized for specific environmental and business concerns.

In step 419, the resiliency level is determined by calculating the Hadamard product (entrywise product) of matrices A and B in matrix C. Subsequently in step 419, resiliency classification tool 707 (as shown in FIG. 7) determines:

$$x = \sum_{j=1}^{9} C_{j,1} \qquad \text{EQ. 2A}$$

$$y = \sum_{j=1}^{9} C_{j,2} \qquad \text{EQ. 2B}$$

$$z = \sum_{j=1}^{9} C_{j,1} \qquad \text{EQ. 2C}$$

The results of EQs. 2A, 2B, and 2C may be used as follows to determine the resiliency level. If x>y≥z, then the resiliency level is estimated to be high. If y>x≥z, then the resiliency level is estimated to be moderate (medium). If z>x≥y, then the resiliency level is estimated to be low. Otherwise, the resiliency level is estimated to be medium.

Figure 6:
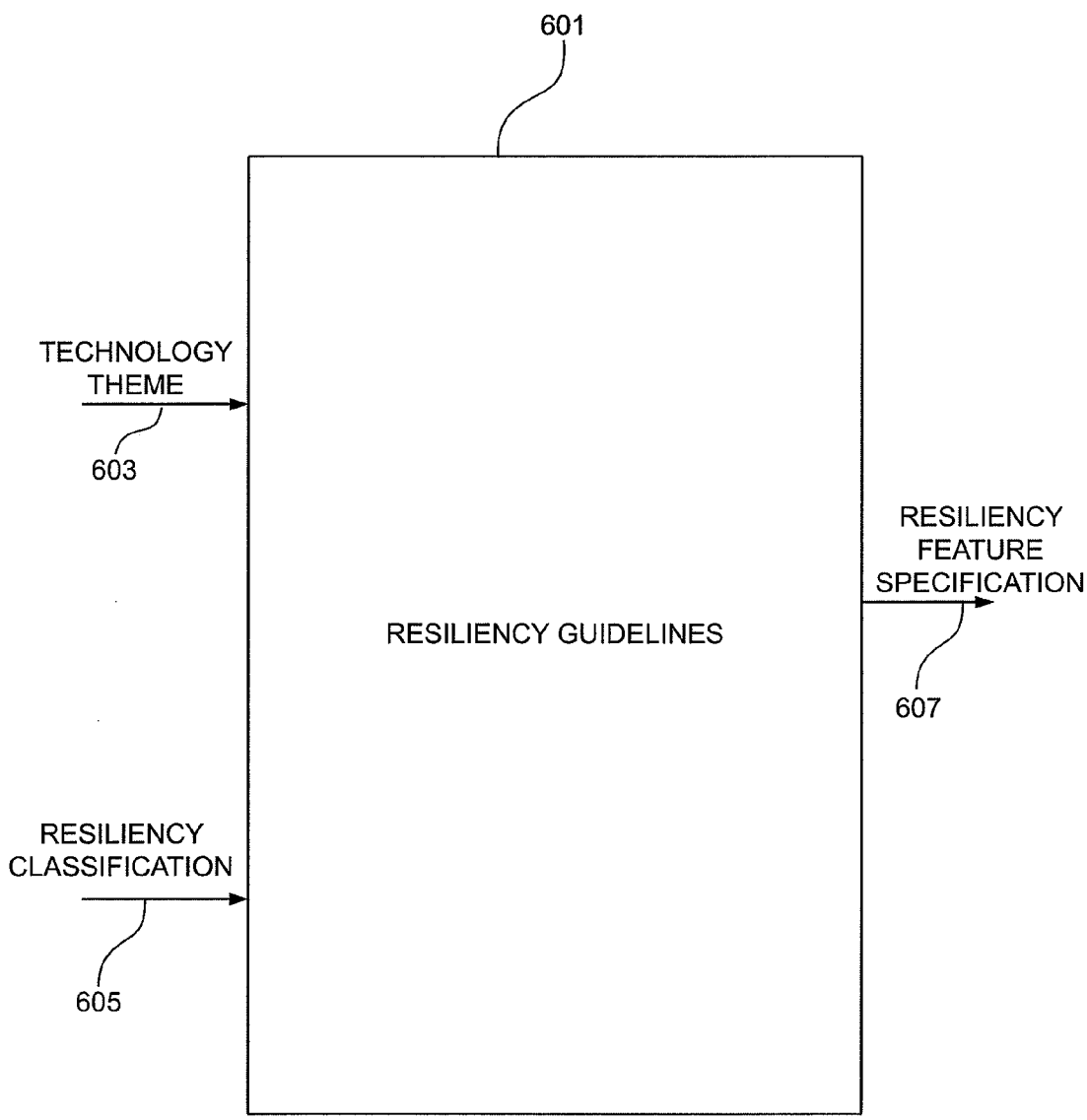
FIG. 6 shows a resiliency guideline module in accordance with an embodiment.

When the level of resiliency has been determined, resiliency guidelines can be accessed as will be further discussed with FIG. 6.

Figure 5:
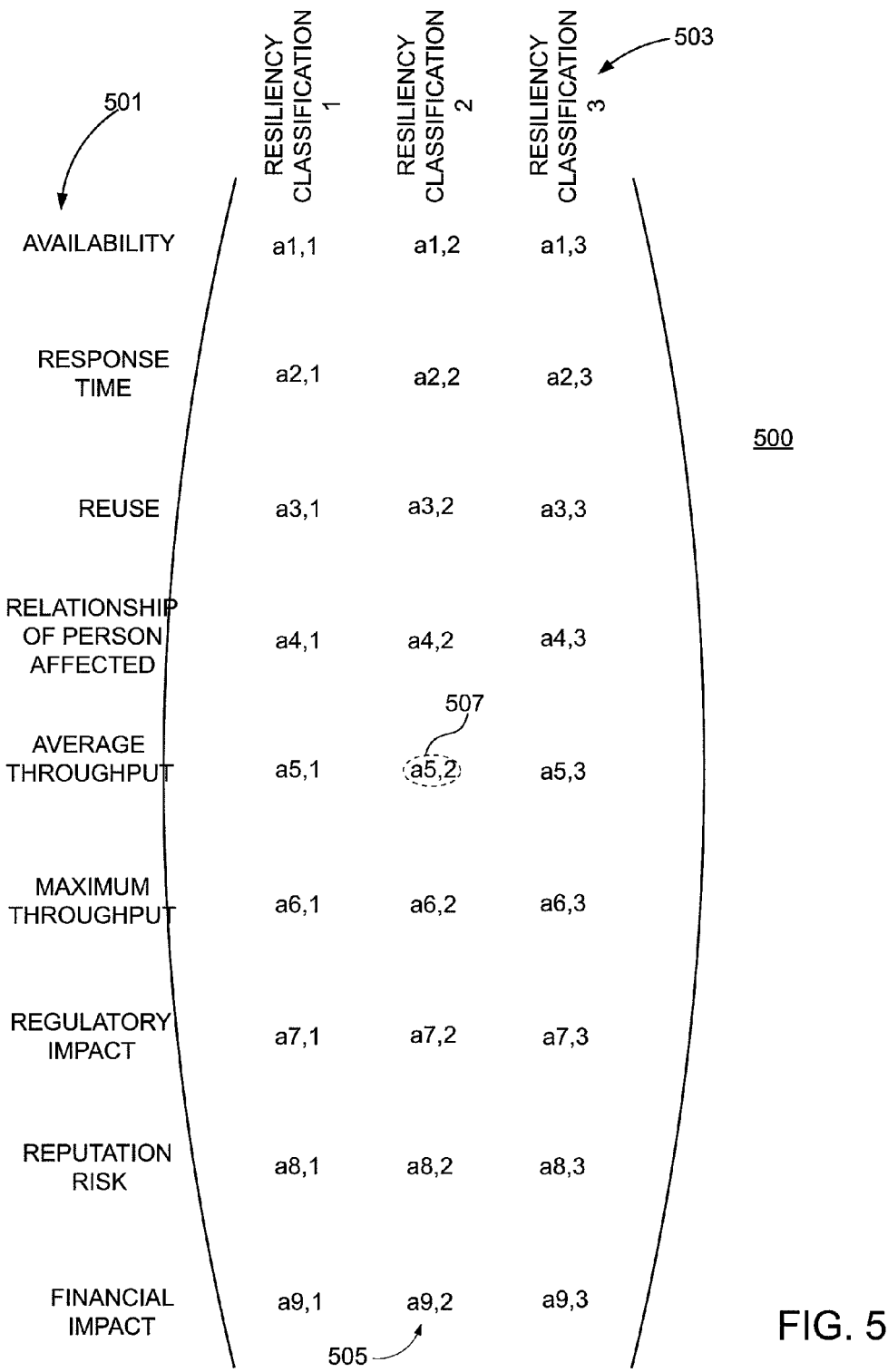
FIG. 5 shows an exemplary resiliency classification matrix in accordance with an embodiment.

FIG. 5 shows an exemplary resiliency classification matrix 500 (corresponding to matrix A) in accordance with an embodiment. Matrix 500 is constructed as a 9×3 matrix, where each row corresponds to a system factor 501 and each column corresponds to a resiliency classification 503. (The first, second, and third resiliency classifications correspond to high, medium, and low, respectively.) Each matrix of matrix 500 is initialized to '0'. Subsequently, matrix elements 505 (e.g., element $a_{5,2}$ 507) are obtained by assigning a factor value for each system factor and each resiliency classification. For example, matrix element $a_{5,2}$ corresponds to average throughput and the second resiliency classification. If the requirement for the average throughput is between 2 and 10 TPS (referring to step 409 as shown in FIG. 4), matrix element $a_{5,2}$ is set to '1'; otherwise matrix element remains as '0'. The remaining matrix elements are obtained in a similar manner.

As previously discussed, system factors may be weighted in accordance with specific environmental and business concerns. If that is the case, matrix A is multiplied by matrix B to obtain matrix C. (If there is no weighing, matrix C is equal to matrix A.) From matrix C, the matrix elements (factor values) are summed (to obtain a total value) over each of the plurality of resiliency classifications. The resiliency level is then determined n accordance with EQs. 2A-2C.

FIG. 6 shows resiliency guideline module 601 (corresponding to resiliency guidelines 709 as shown in FIG. 7) in accordance with an embodiment. Resiliency guideline module 601 is organized by technology theme 603 and the corresponding importance based on the resiliency classification 605 of the solution (as assessed by the processes shown in FIGS. 3 and 4).

Resiliency guidelines contained in the resiliency guideline module 601 provide guidance as to how to meet the needs of a system requiring a particular resiliency level. Resiliency guideline module is organized into major technology themes 603 (e.g., redundancy, monitoring of systems, and load balancing across components). Within each technology theme 603, resiliency feature specification 607 (specific design considerations) is explained and then expressed as to whether the resiliency feature is required, recommended, or optional for each resiliency classification 605.

With an embodiment, resiliency guideline module 601 is constructed as a workbook that contains the process for estimating and determining the resiliency level (embedded within worksheet as a matrix to be completed and a formula that determines the classification based on the matrix contents) and the resiliency guidelines (organized into worksheets by technology theme 603 and further categorized by importance based on resiliency classification 605).

FIG. 9 shows the structure of a handbook for resiliency guidelines. The handbook is organized into topics (technology themes) of resiliency guidelines (abbreviated G1, G2, . . . , Gn) across several tabs in the workbook as well as the "Resiliency Design Classification" (RDC) that guide an architect in determining the level of resiliency needed for a particular initiative or solution. The RDC results in a suggested classification of "High", "Moderate" and "Low" Resiliency. The guidelines in the tabs following the RDC are organized by the resiliency classification for which a particular guideline should be considered.

Each guideline has a resiliency classification column for Gold, Silver and Bronze that indicates whether the guideline is "Required", "Recommended" or "Optional" for a solution with a given classification. The "required" assertion indicates that the guideline must be implemented. Recommended is the strongest implementation suggestion—some recommended guidelines may eventually become requirements. Desirable indicates that the guidelines should be given consideration and is likely to add resiliency, but is not as strong a suggestion as those with "Recommended" status. Optional indicates that while the guideline may add resiliency, it probably is unnecessary or not applicable for a given resiliency class.

The guidelines are organized into themes based on over a hundred guidelines originally suggested by a variety of subject matter experts from architecture and operations.

FIGS. 10-18 show exemplary resiliency guidelines having worksheets corresponding to technology themes: Redundancy, Monitoring, Governors, Documentation, Load Balancing, Degraded mode, Component interaction, Operational considerations, and Applications design. A system architect determines the specification for a resiliency feature by accessing the set of resiliency guidelines based on the resiliency level and the technology theme. For example, regarding the technology theme of redundancy, N+M, or N+1, or no nodal redundancy is configured for middleware servers when the resiliency level is high, moderate, or low, respectively. The system architecture can then apply the resiliency feature into the information technology system.

FIG. 7 shows resiliency framework system 700 in accordance with an embodiment. Resiliency framework system 700 estimates the resiliency level by providing high level description 701 to resiliency estimation tool 703 (corresponding to process 300). Estimation tool 703 is typically used in the early stages of evaluating a proposed business initiative. Different system characteristics are used to estimate the resiliency level of the information technology system from a plurality of resiliency classifications (e.g., high, moderate, and low). The resiliency features of an application are related to the cost of the solution. Building highly resiliency solutions may add significant cost to an initiative. By providing an estimation early, resiliency estimation tool 703 enables a business to determine the value of continuing to move forward based on the costs.

Resiliency classification tool 707 determines the resiliency level of the information technology system from business requirements 705. As previously discussed, FIG. 4 shows framework classification process 400 (as performed by resiliency classification tool 707 as shown in FIG. 7) in accordance with an embodiment. The use of the classification framework allows architects to determine the resiliency needs of a solution. Resiliency classification framework tool 707 assesses how resilient the information technology system needs to be based on a number of factors (such as who uses the system, the legal, compliance and regulatory risk posed by failure, and who is affected by a failure).

Tools 703 and 707 may be used by technology architects when considering a business initiative so that they can assess the needs of the project in a consistent fashion, systematically apply necessary architectural features based on the resiliency need and use a common language when discussing those features related to the resiliency of a project.

When the resiliency level has been determined by resiliency classification tool 707, resiliency guidelines 709 are accessed according to technology theme and the resiliency level. Resiliency guidelines provide features specifications so that the desired features can be incorporated into the information technology system.

Using the resiliency framework system 700 to determine which guidelines to apply ensures that resiliency guidelines 709 are applied in a consistent manner. Without having a classification framework to direct the application of the guidelines, the guidelines could be applied haphazardly and inconsistently, undermining their effectiveness. Resiliency framework system 700 ensures that the determination of resiliency is systematic. Whereas architects previously would make an individual assessment of the needs of a solution in accordance with the prior art, resiliency framework system 700 enables architects to assess resiliency needs using a common methodology. Further, resiliency framework system 700 provides a common vocabulary for discussing resiliency needs and features. Consequently all architects have a common definition of high, moderate and low resiliency needs.

Figure 8:
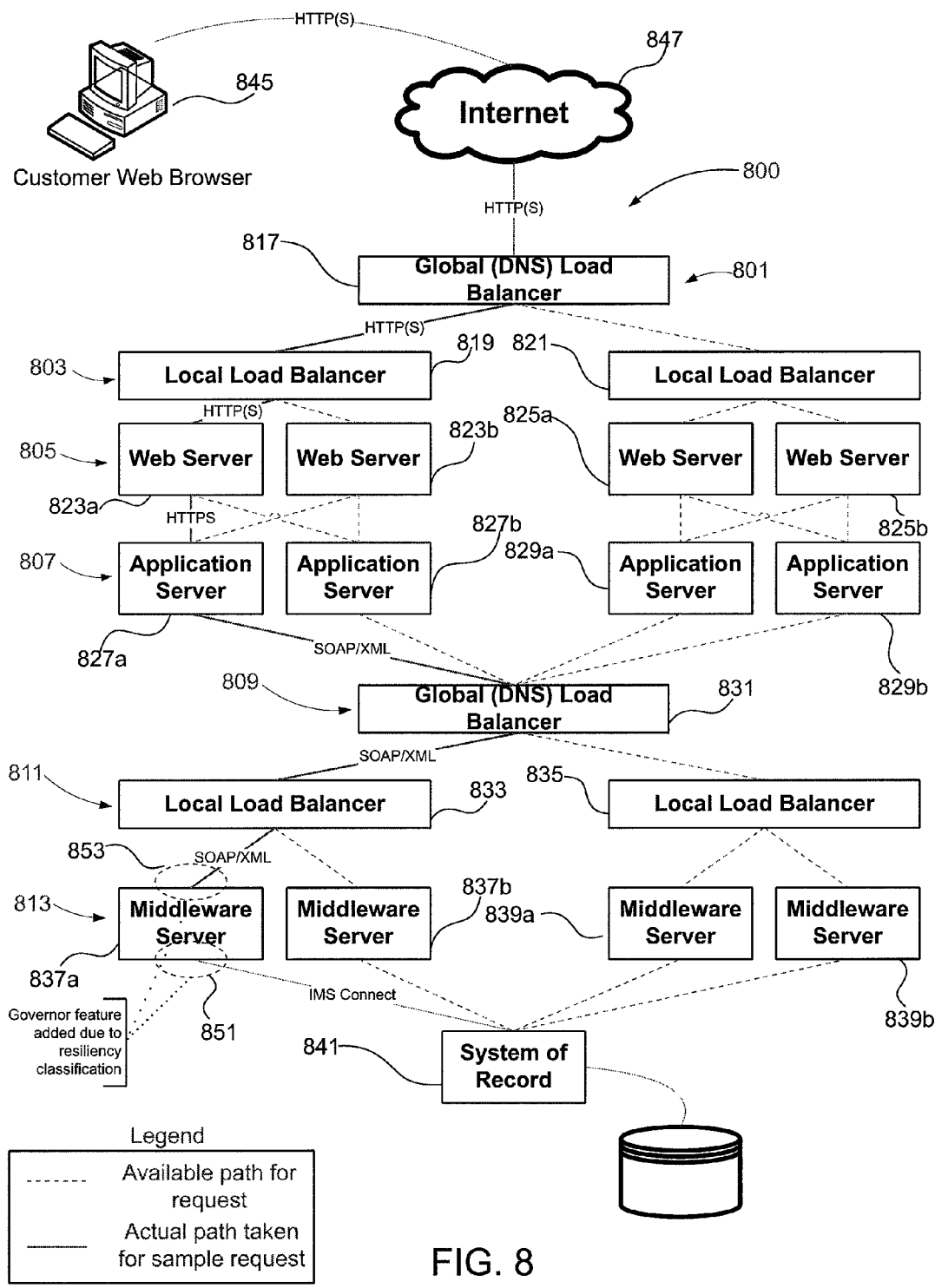
FIG. 8 shows an exemplary system in which a resiliency classification framework is applied in accordance with an embodiment.

To summarize, resiliency framework system 700 is characterized by the following features:
- Provides a framework for assessing resiliency needs of a system in a consistent way
- Provides an organizational system for categorizing resiliency features and recording their importance/criticality in achieving a particular resiliency level
- Incorporates a diverse set of factors within the assessment framework for determining the resiliency need of a particular solution FIG. 8 shows an exemplary information technology system 800 in which a resiliency classification framework is applied in accordance with an embodiment. System 800 provides service to customer web browser 845 through Internet 847. System 800 is partitioned into different system layers (stack layers) 801-813 corresponding to global load balancer 817, local load balancers 819 and 821, web servers 823 and 825, application servers 827 and 829, global load balancer 831, local load balancers 833 and 835, and middleware servers 837 and 835.

FIG. 8 depicts an internet web application constructed in multiple tiers. The application provides customers the capability to perform self-service operations, such as viewing account balances, transaction and statement history, performing funds transfers, bill payments, and updating customer profile information (e.g., statement address, email notification preferences, customer phone number, and the like).

The web servers act as the presentation layer to provide the web content to the customer. This application is provided dynamically by the application server which contains the business logic to generate the content, manage interaction with the customer, maintain the state of the customer's session throughout the duration of the customer interaction, and mediate the requests for information to the middleware servers.

The middleware servers manage the interaction to many systems of record, providing a consistent interface to the application server (for example, using SOAP/XML web services) and abstracting the complexity of the variety of systems of record from which this information is retrieved (often with varying protocols and interfaces).

In exemplary diagram 800, circles 851 and 853 show that the resiliency guidelines were applied. In this case, a governor was added to throttle traffic coming into middleware server 833*a* and between middleware server 833*a* and mainframe system of record 841. With an exemplary embodiment, the application of this pattern to an application used at a bank resulted in a 47% decrease in failed customer interactions (FCI's).

In this example, the decrease of failed customer interactions highlighted an unexpected benefit. When the governor pattern was applied, system architects gained insight into the availability of system of record applications. By applying the pattern, system architects discovered that some key systems that were thought to be very highly available had frequent degraded service events. Typically, one could never have polled these systems with monitors/probes with enough frequency to determine this using synthetic monitoring. The volume needed to detect these events was so great that monitoring would have prevented the system from servicing real customer requests. The governor allows system architects to sample system behavior using real traffic, so that system architects obtain much better performance data without paying the penalty of synthetic monitoring.

Aspects of the invention have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

We claim:

1. A computer-assisted method comprising:
    receiving, by a resiliency classification system having a processor, a proposed business initiative including an information technology system;
    determining, by the resiliency classification system, a resiliency level of the proposed business initiative information technology system from a plurality of system factors for an information technology system, wherein determining the resiliency level of the proposed business initiative information technology system comprises calculating an entrywise product of a first matrix and a second matrix, the first matrix comprising results of a plurality of assessment criteria, the plurality of assessment criteria comprising a criteria for assessing whether a user interface associated with the proposed business initiative information technology system includes a customer-facing user interface, a criteria for assessing whether the proposed business initiative information technology system involves selling products to customers, a criteria for assessing profitability of the proposed business initiative information technology system, and a criteria for assessing transaction volume of the proposed business initiative information technology system, and the second matrix comprising a plurality of weighting values, each of the plurality of weighting values corresponding to one or more of the plurality of system factors, wherein the resiliency level is one of a plurality of resiliency classifications, and wherein the plurality of system factors include: legal, compliance, and regulatory risk posed by a failure of the proposed business initiative information technology system; whether a failure of the proposed business initiative information technology system would be directly visible to an external customer; and a degree of expected reuse corresponding to how one or more components of the information technology system could be reused by other systems, wherein the resiliency level of the proposed business initiative information technology system is determined to be higher if a failure of the proposed business initiative information technology system would pose a legal, compliance, or regulatory risk than if a failure of the proposed business initiative information technology system would not pose a legal, compliance, or regulatory risk, and wherein the resiliency level of the proposed business initiative information technology system is determined to be higher if a failure of the proposed business initiative information technology system would be directly visible to an external customer than if a failure of the proposed business initiative information technology system would not be directly visible to an external customer;
    determining a specification for a resiliency feature by accessing a set of resiliency guidelines based on the resiliency level and a technology theme;
    determining an estimated cost of the proposed business initiative including the information technology system based, at least in part, on the determined resiliency level and the determined specification for the resiliency feature, wherein determining the estimated cost of the proposed business initiative includes determining the estimated cost of the proposed business initiative based, at least in part, on the degree of expected reuse; and
    determining a value of proceeding with the proposed business initiative based on the determined estimated cost.

2. The method of claim 1, wherein determining, by the resiliency classification system, a resiliency level of the proposed business initiative information technology system from a plurality of system factors for an information technology system, wherein the resiliency level is one of a plurality of resiliency classifications, further comprises:
    assigning a factor value with each combination of system factor and resiliency classification;
    summing all factor values over each of the plurality of resiliency classifications to obtain a total value corresponding to each of the plurality of resiliency classifications; and
    selecting the resiliency level based on the total value.

3. The method of claim 2, wherein assigning a factor value with each combination of system factor and resiliency classification further comprises:
    determining the factor values from a set of business requirements.

4. The method of claim 2, further comprising:
    adjusting each system factor based on a corresponding weight.

5. The method of claim 1, further comprising:
    prior to determining, by the resiliency classification system, a resiliency level of the proposed business initiative information technology system from a plurality of system factors for an information technology system, wherein the resiliency level is one of a plurality of resiliency classifications, estimating the resiliency level from a plurality of system characteristics to obtain an estimated resiliency level for the information technology system.

6. The method of claim 5, further comprising:
estimating an initiative cost to create a design for the information technology system based on the estimated resiliency level.

7. The method of claim 5, further comprising:
generating business requirements from the estimated resiliency level.

8. The method of claim 1, wherein the set of resiliency guidelines is formatted in a spreadsheet format, wherein:
spreadsheet worksheets are organized by the technology theme; and
the specification for the resiliency feature is obtained from the resiliency level.

9. The method of claim 1, wherein the information technology system renders a banking service.

10. The method of claim 1, wherein the information technology system is partitioned into a plurality of system layers and includes:
applying the resiliency feature to an appropriate system layer.

11. The method of claim 1, wherein the plurality of resiliency classifications comprises high, moderate, and low.

12. The method of claim 1, wherein a recommendation for the resiliency feature is one of: required, recommended, or optional.

13. The computer-assisted method of claim 1, wherein the degree of expected reuse is based on the one or more components of the information technology system.

14. A non-transitory computer-readable medium storing computer-executable instructions that cause a processor to:
receive a proposed business initiative including an information technology system;
determine a resiliency level of the proposed business initiative information technology system from a plurality of system factors for an information technology system by calculating an entrywise product of a first matrix and a second matrix, the first matrix comprising results of a plurality of assessment criteria, the plurality of assessment criteria comprising a criteria for assessing whether a user interface associated with the proposed business initiative information technology system includes a customer-facing user interface, a criteria for assessing whether the proposed business initiative information technology system involves selling products to customers, a criteria for assessing profitability of the proposed business initiative information technology system, and a criteria for assessing transaction volume of the proposed business initiative information technology system, and the second matrix comprising a plurality of weighting values, each of the plurality of weighting values corresponding to one or more of the plurality of system factors, wherein the resiliency level is one of a plurality of resiliency classifications, and wherein the plurality of system factors include: legal, compliance, and regulatory risk posed by a failure of the proposed business initiative information technology system; whether a failure of the proposed business initiative information technology system would be directly visible to an external customer; and a degree of expected reuse corresponding to how one or more components of the information technology system could be reused by other systems, wherein the resiliency level of the proposed business initiative information technology system is determined to be higher if a failure of the proposed business initiative information technology system would pose a legal, compliance, or regulatory risk than if a failure of the proposed business initiative information technology system would not pose a legal, compliance, or regulatory risk, and wherein the resiliency level of the proposed business initiative information technology system is determined to be higher if a failure of the proposed business initiative information technology system would be directly visible to an external customer than if a failure of the proposed business initiative information technology system would not be directly visible to an external customer;
determine a specification for a resiliency feature by accessing a set of resiliency guidelines based on the resiliency level and a technology theme;
determine an estimated cost of the proposed business initiative including the information technology system based, at least in part, on the determined resiliency level and the determined specification for the resiliency feature, wherein the estimated cost of the proposed business initiative is determined based, at least in part, on the degree of expected reuse; and
determine a value of proceeding with the proposed business initiative based on the determined estimated cost.

15. The non-transitory computer-readable medium of claim 14, wherein determining a resiliency level of the proposed business initiative information technology system from a plurality of system factors for an information technology system, wherein the resiliency level is one of a plurality of resiliency classifications further comprises:
assigning a factor value with each combination of system factor and resiliency classification;
summing all factor values over each of the plurality of resiliency classifications; and
selecting the resiliency level from a total value corresponding to each of the plurality of resiliency classifications.

16. The computer-readable medium of claim 15, wherein assigning a factor value with each combination of system factor and resiliency classification further comprises:
determining the factor values from a set of business requirements.

17. The non-transitory computer-readable medium of claim 15, further comprising:
adjusting each system factor based on a corresponding weight.

18. The non-transitory computer-readable medium of claim 14, further comprising:
prior to determining a resiliency level of the proposed business initiative information technology system from a plurality of system factors for an information technology system, wherein the resiliency level is one of a plurality of resiliency classifications, estimating the resiliency level from a plurality of system characteristics for the information technology system.

19. An apparatus comprising:
at least one processor; and
memory operatively coupled to the at least one processor and storing computer readable instructions that, when executed, cause the apparatus to:
receive a proposed business initiative including an information technology system;
determine a resiliency level of the proposed business initiative information technology system from a plurality of system factors for an information technology system by calculating an entrywise product of a first matrix and a second matrix, the first matrix comprising results of a plurality of assessment criteria, the plurality of assessment criteria comprising a criteria for assessing whether a user interface associated with the proposed business initiative information technology system includes a customer-facing user interface, a criteria for assessing whether the proposed business initiative information technology system involves selling products to customers, a criteria for assessing profitability of the proposed business initiative information technology system, and a criteria for assessing transaction volume of the proposed business initiative information technology system, and the second matrix comprising a plurality of weighting values, each of the plurality of weighting values corresponding to one or more of the plurality of system factors, wherein the resiliency level is one of a plurality of resiliency classifications, and wherein the plurality of system factors include: legal, compliance, and regulatory risk posed by a failure of the proposed business initiative information technology system; whether a failure of the proposed business initiative information technology system would be directly visible to an external customer; and a degree of expected reuse corresponding to how one or more components of the information technology system could be reused by other systems, wherein the resiliency level of the proposed business initiative information technology system is determined to be higher if a failure of the proposed business initiative information technology system would pose a legal, compliance, or regulatory risk than if a failure of the proposed business initiative information technology system would not pose a legal, compliance, or regulatory risk, and wherein the resiliency level of the proposed business initiative information technology system is determined to be higher if a failure of the proposed business initiative information technology system would be directly vis-ible to an external customer than if a failure of the proposed business initiative information technology system would not be directly visible to an external customer;

determine a specification for a resiliency feature by accessing a set of resiliency guidelines based on the resiliency level and a technology theme;

determine an estimated cost of the proposed business initiative including the information technology system based, at least in part, on the determined resiliency level and the determined specification for the resiliency feature, wherein the estimated cost of the proposed business initiative is determined based, at least in part, on the degree of expected reuse; and determine a value of proceeding with the proposed business initiative based on the determined estimated cost.

20. The apparatus of claim 19, further comprising instructions that, when executed, cause the apparatus to:

estimate the resiliency level of an information technology system from a plurality of system characteristics for the information technology system.

21. The apparatus of claim 19, further including instructions that, when executed, cause the apparatus to:

assign a factor value with each combination of system factor and resiliency classification;

sum all factor values over each of the plurality of resiliency classifications to obtain a total value corresponding to each of the plurality of resiliency classifications; and select the resiliency level based on the total value.

22. The apparatus of claim 21, further including instructions that, when executed, cause the apparatus to:

adjust each system factor based on a corresponding weight.

23. The apparatus of claim 20, wherein:

the set of resiliency guidelines is formatted in a spreadsheet format; and spreadsheet worksheets are organized by the technology theme.

* * * * *